United States Patent [19]

Freimanis

[11] 4,056,689
[45] Nov. 1, 1977

[54] TELEPHONE SUBSCRIBER LINE CIRCUIT

[75] Inventor: Laimons Freimanis, Chicago, Ill.

[73] Assignee: Bell Telephone Laboratories, Incorporated, Murray Hill, N.J.

[21] Appl. No.: 757,005

[22] Filed: Jan. 5, 1977

[51] Int. Cl.² ............................................. H04Q 1/30
[52] U.S. Cl. .............................. 179/16 F; 179/18 FA
[58] Field of Search ................... 323/22 T; 179/16 F, 179/77, 18 F, 18 FA, 18 HB, 18 H, 81 R, 84 R, 84 A

[56] References Cited

U.S. PATENT DOCUMENTS

| 3,522,384 | 7/1970 | Ricketts et al. | 179/16 F |
| 3,546,564 | 12/1970 | Denny | 323/22 T |
| 3,914,556 | 10/1975 | Frazee | 179/18 F |
| 3,955,052 | 5/1976 | Orbach | 179/18 FA |
| 4,027,235 | 5/1977 | Macrander et al. | 179/18 FA |

Primary Examiner—Thomas A. Robinson
Attorney, Agent, or Firm—Peter Visserman

[57] ABSTRACT

A communication line interface circuit including a floating current source supplying a constant current substantially independent of loop length is disclosed. The line interface circuit is provided with circuitry for line supervision and the detection of dial pulse signaling.

8 Claims, 5 Drawing Figures

TELEPHONE SUBSCRIBER LINE CIRCUIT

CROSS REFERENCE TO RELATED APPLICATION

This application is related to the application of L. Freimanis, H. E. Mussman, and D. P. Smith entitled "Telephone Subscriber Line Circuit" Ser. No. 757,006 filed concurrently herewith and assigned to the assignee of the present application.

BACKGROUND OF THE INVENTION

This invention relates to a communication line interface circuit for use in a switching office and more particularly relates to a telephone line interface circuit which supplies power to a loop including subscriber apparatus from the switching office.

Generally, standard circuits for supplying power to a telephone subscriber loop are designed for a maximum length loop, e.g., a loop presenting a load of approximately 1300 ohms. For longer loops, additional circuitry will be required. For short, low impedance loops, the standard power supply circuit will tend to deliver an excessive amount of current. To protect the apparatus, the excess current is commonly shunted by means of varistors installed in the apparatus. Elimination of the high current consumption in low impedance loops will be desirable not only to protect the station apparatus but also to allow a reduction in power dissipation requirements of supply circuits and to reduce the generation of heat and the overall current consumption of the switching office. The latter two are of particular importance in small, remotely located switching offices which do not operate in a controlled environment and which may be required to run on emergency battery power for several hours in the event of commercial electrical power failure.

The desirability of a power source in a telephone exchange which provides a constant current to the loop independent of loop length has been recognized in the prior art. One prior art arrangement employs a D.C. to D.C. converter to raise the output potential in order to provide greater power for long loops and uses a standard transistor base-to-emitter feedback current regulator circuit to apply a constant current to the loop. However, in such an arrangement, considerable power is dissipated in the regulator circuit and, hence, such an arrangement is not desirable in an environment where power usage and heat dissipation must be minimized.

SUMMARY OF THE INVENTION

It is an object of this invention to provide a current supply circuit capable of providing a constant current to a communication line substantially independent of length of the loop and the impedance of the load.

It is a further object of the invention to provide such a line interface circuit wherein power consumption is minimized.

In accordance with this invention, a power conversion circuit of the type which stores energy in a magnetic structure is used, comprising an output transformer and first and second sense windings. Current flow through the primary coil of the transformer is controlled by a transistor having a base terminal connected to the first sense winding and operating generally as a blocking oscillator with emitter timing.

A comparator circuit having a first input terminal connected to the emitter terminal of the transistor and a second input terminal connected to the second sense winding is used to control the operation of the transistor as a function of the output voltage developed across the load. In commonly known blocking oscillators with emitter timing, the transistor collector current, which is the primary coil current, will tend to increase and the base current supplied by the feedback sense winding will tend to decrease until the base current becomes insufficient to keep the transistor in saturation. By regenerative action, the transistor is turned off abruptly. At this point, energy will be transferred to the transformer secondary coil and secondary current will begin to flow. In a circuit in accordance with this invention, the secondary coil is connected to an output filter through a diode which serves to prevent reverse currents in the secondary coil. During the transformer discharge cycle, a negative voltage is induced in the feedback sense winding applying a negative bias to the base of the transistor. When the discharge cycle is completed, the voltage induced across the feedback sense winding from the secondary will tend to reverse, causing a positive bias to be applied to the base and allowing the transistor to be turned on again. The peak current through the primary coil will be directly dependent upon the value of the emitter resistor and it is desirable to reduce the value of the emitter resistor in order to increase the available peak current and, hence, the energy supplied to the load. However, the duration of the output pulse may become undesirably long as the value of the emitter resistor is reduced. Advantageously, in accordance with this invention, the width of the output pulse is controlled by means of the comparator as a function of the output voltage and a low value emitter resistor may be used to allow greater transformer primary currents. The output voltage increases as the impedance of the load increases, and the relative value of the output voltage will be reflected in the second sense winding which charges an RC circuit during the transformer discharge cycle. The comparator compares the potential across the RC circuit with the potential across the emitter resistor during the transformer charge cycle and turns off the transistor by clamping the base to ground when the emitter potential reaches that of the RC circuit. When the impedance of the load across the secondary circuit is low, the output voltage, and hence the charge across the RC network connected to the comparator, will be relatively low and the circuit will produce relatively short output pulses. As the impedance of the load increases, the output voltage will increase and the circuit will produce longer output pulses transferring more energy to the output circuit.

It is a feature of this invention that the power supply circuit may be adjusted to generate a substantially flat output current characteristic.

It is a further feature of this invention that high output currents may be provided over a selected range of low impedance loops by biasing the comparator circuit.

BRIEF DESCRIPTION OF THE DRAWING

The above and other objects and features of this invention are illustrated in the following description in which reference is made to the accompanying drawing, in which.

DETAILED DESCRIPTION

Figure 1:
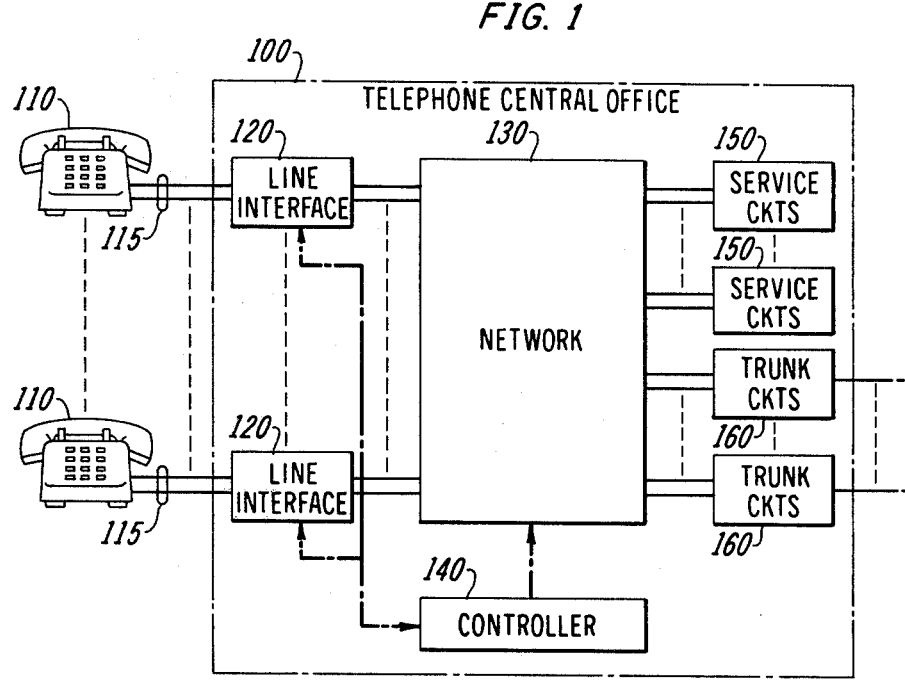
FIG. 1 is a representation of a telephone communication system in general block diagram form.

In an illustrative embodiment of this invention as depicted in the drawing and described herein, a plurality of telephone subscriber sets 110 are connected to a telephone central office 100 by means of communication lines 115 and line interface circuits 120. By way of illustration, a central office may comprise a switching network 130, a plurality of line interface circuits 120, as well as a controller 140, service circuits 150, and trunk circuits 160. As is customary, the line circuits provide an interface between the communication lines 115 and the switching network 130. The service circuits 150 generally include such circuits as signal pulse receivers, tone circuits, etc. The trunk circuits provide an interface with the transmission lines connected to a distant central office. The controller 140 will sense the operational state and activities of the lines and trunk circuits to detect certain signaling information and will control the network to establish connections between the various circuits and control the state of the circuits as required.

Figure 2:
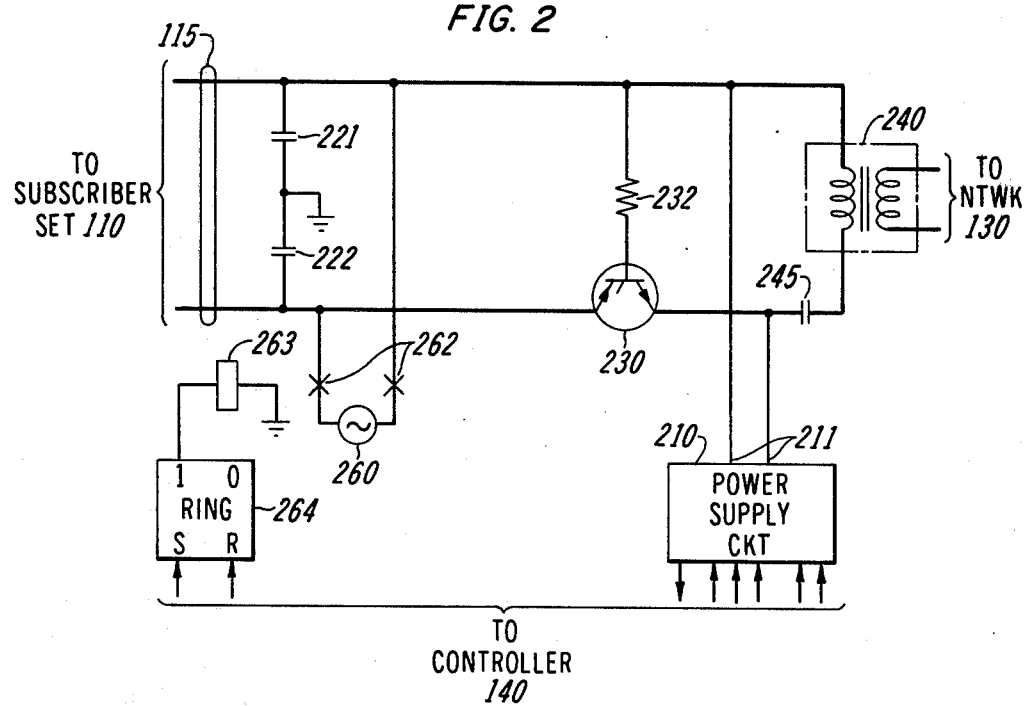
FIG. 2 shows a communication line interface circuit for use in a telephone communication system in accordance with the invention.

The details of the line interface circuit arrangement 120 are discussed with reference to FIG. 2. One end of the line circuit is connected to a subscriber set by means of communication lines 115. Direct current will be supplied to the line and to the subscriber set from the power supply circuit 210 which is connected to the line interface circuit by conductors 211. When the subscriber set is in the on-hook state, the set presents an open circuit and no current will flow in the loop. When the subscriber set goes off-hook, a switch in the set is closed and current supplied by the interface circuit will begin to flow in the loop. The flow of current is sensed by the controller 140 by periodically scanning the line in the central office. After detection of the off-hook condition, the controller 140 will initiate further actions for completion of the call. In the case of an originating call from a subscriber, dial tone will be supplied and dial signaling information must be received; and in case of a call to a station, ringing current must be supplied to the line. Since the network 130 may comprise solid-state crosspoints, which are not designed to withstand voltages of a magnitude customarily generated by available ringing tone generators, ringing current is applied to the line 115 without passing through the network 130 or the interface circuit in this illustrative embodiment. The line 115 is connected directly to a ringing current generator 260 by means of relay contacts 262. The relay 263 which operates the contacts 262 is controlled by the RING flip-flop 264 which, in turn, is set and reset from the controller 140. To isolate the line 115 from the network 130 during ringing, a solid-state device commonly known as a thyristor is provided. For the purpose of isolation, a solid-state device such as a thyristor is preferred over metallic relay contacts or the like, since relays are bulkier and generally more costly than solid-state devices. In the normal operative state of the circuit, the thyristor 230 will be in saturation due to base current supplied by the resistor 232. During the ringing period the power supply circuit will be deactivated by the controller 140, as described further below, and no current will be supplied to the thyristor which will act as an isolator in the off state. The line interface circuit is coupled to the network 130 by means of transformer 240. The capacitor 245 is provided to block the flow of direct current to the transformer 240.

Advantageously, the line interface output circuit will not be referenced to earth ground and will be considered to be a floating circuit. Consequently, so-called longitudinal currents induced in communication lines from adjacent electrical power lines, primarily 60-hertz alternating currents, will not find a path to ground through the circuit and, hence, will not interfere with the operation of the circuit. To reduce RF interference, a pair of balancing capacitors 221 and 222 are connected between the line conductors and earth ground. However, these may be small capacitors, for example, on the order of 100 picofarads, which will not conduct an significant amount of the 60-hertz alternating currents.

Figure 3:
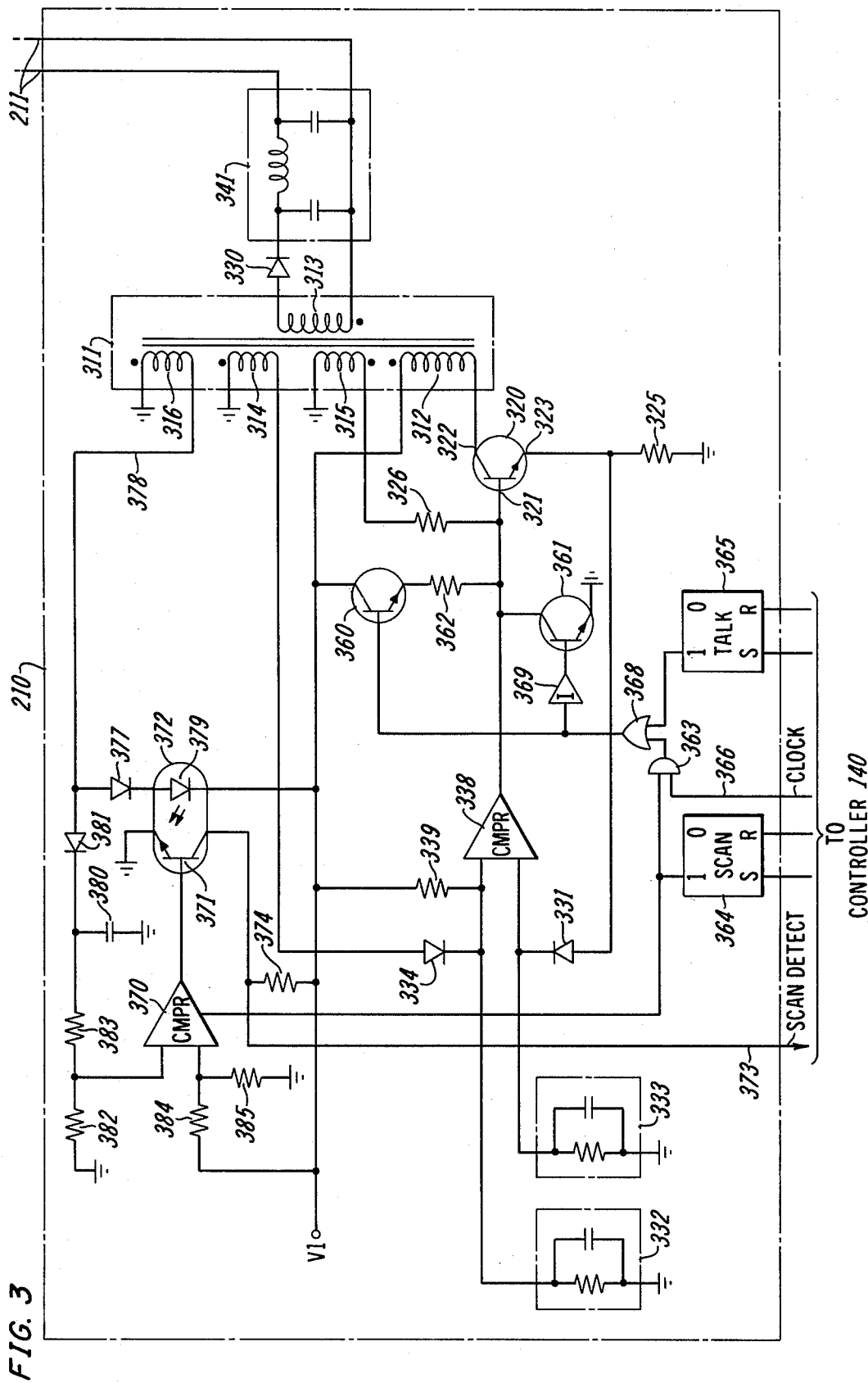
FIG. 3 shows in greater detail the power supply circuit for use with a communication line interface circuit in accordance with one specific embodiment of the invention.

The further details of one specific illustrative embodiment of a power supply circuit 210 are shown in FIG. 3. The power supply circuit comprises a transformer circuit 311 having a primary coil 312, a secondary coil 313, and sense windings 314, 315, and 316. The secondary coil 313 is connected to the output conductors 211 via diode 330 and an LC filter circuit 341. Current flow in the primary coil 312 is controlled by means of the transistor 320. Base current for the transistor 320 may be supplied to the conductor 321 from the D.C. power source designated by V1 through transistor 360 and resistor 362 or from the sense winding 315 and resistor 326. The operation of the transistor 320 may be inhibited by clamping the conductor 321 to ground by means of the transistor 361 or comparator circuit 338. To reduce power consumption of the central office, the line interface circuit will be operative to supply power to the line 115 only when the line is in the talking state or when the line is being scanned for an off-hook or on-hook condition. A SCAN flip-flop 364 and a TALK flip-flop 365, which may be set and reset from the controller 140, are employed to control the power supply circuit. When both the SCAN flip-flop 364 and the TALK flip-flop 365 are in the reset state, the transistor 361 will be in the conducting state clamping the conductor 321 to ground and inhibiting operation of the power supply circuit. Base drive to the transistor 361 is cut off by inverter 369 under control of the OR gate 368 when either the SCAN or TALK flip-flop is in the set state.

Scanning for the on-hook/off-hook state of a communication line may advantageously be done at the power supply circuit 210 of the line interface circuit. To determine the state of the line 115, the controller 140 will set the SCAN flip-flop 364 and will interrogate the state of conductor 373. Origination off-hook scanning will be done with a relatively low frequency in order to reduce power consumption when the line is not in use. The circuit will be activated only on a periodic basis by means of a clock signal which is supplied from the controller 140 on conductor 366. When the SCAN flip-flop 364 is in the set state, the clock signal will appear at the output of the AND gate 363 and cause the transistor 360 to be placed in the conducting state and the transistor 361 to be placed in a nonconducting state for the duration of the clock pulse. In this fashion, base drive will be supplied to the transistor 320 and power will be supplied to the line in a manner described hereinafter. Furthermore, when the SCAN flip-flop 364 is in the set state, the comparator circuit 370 will be enabled. An indication of the level of output voltage will be supplied to one input terminal of the comparator 370 from the sense winding 316. When such level exceeds a reference voltage applied to a second input terminal to the comparator 370, base current will be supplied to the transistor 371 which is part of an optical isolator circuit 372 and which will be referred to later herein. The voltage across the sense winding 316 will be directly proportional to the output voltage across the secondary coil 313. This voltage will be comparatively low in the off-hook state when the line impedance is comparatively low and will be substantially higher in the on-hook state when line impedance is high. The output voltage and the voltage across the sense winding 316 will be in pulse form corresponding to the enabling clock pulses supplied on conductor 366. The capacitor 380 and diode 381 serve as a rectifier circuit. The resistors 382, 383, 384, and 385 are provided to adjust the input signals of the comparator 370 to desired levels.

When the transistor 371 is in a nonconducting state, the conductor 373 will have the same positive potential as the power source V1; and when the transistor 371 is in a conducting state, the potential on conductor 373 will be near zero. The state of the conductor 373 will be interrogated by the controller 140 and a determination can be made as to the on-hook or off-hook condition of the line 115 as a function of the output voltage across the line 115 as sensed by the sense winding 316.

Figure 4:
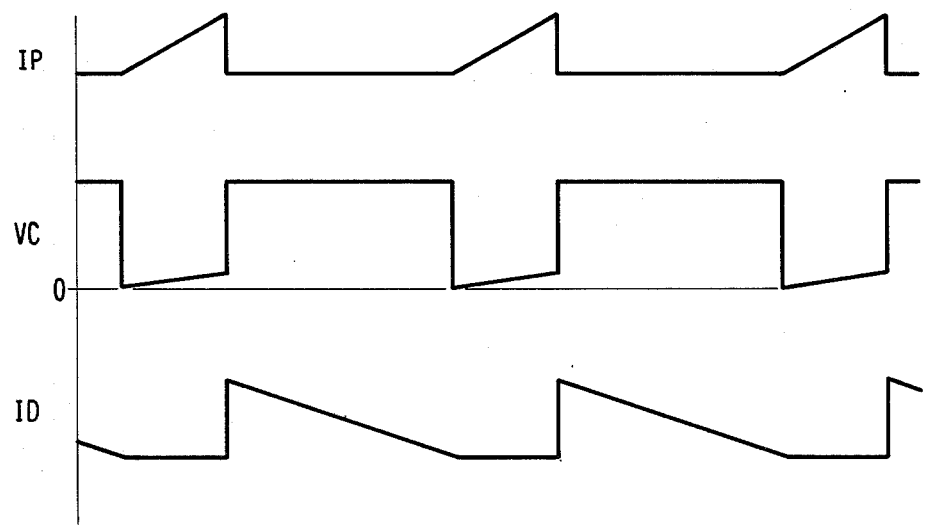
FIG. 4 shows current and voltage waveforms at selected points in the circuit.

The base current supplied by the transistor 360 will preferably be sufficient only to place the transistor 320 in the active state. When transistor 320 is in the active state, current will begin to flow in the primary coil 312. This current will induce a voltage across the feedback sense winding 315 supplying additional current to the base of the transistor 320 through the feedback resistor 326. The amount of current supplied to the base of the transistor 320 must be sufficient to hold the transistor in saturation during the desired period of increasing current flow in the primary coil 312. It will be recognized that the current supplying capacity of the feedback circuit is determined by the turns ratio of the sense winding 315 to the primary coil 312 and the value of the feedback resistor 326. FIG. 4 shows typical waveforms for the primary current IP, the collector voltage VC as seen on conductor 322, and the secondary current ID flowing through diode 330. As may be seen from FIG. 4, the primary current IP, which is initially at zero, will increase substantially as a ramp function. The collector voltage initially drops to a near zero value, and thereafter slowly rises as the voltage across the emitter resistor 325 increases. Eventually, the collector current will increase to such a value that the base current becomes insufficient to keep the transistor 320 in saturation and the transistor will turn off abruptly. The transformer discharge cycle will be initiated at that time and current ID will begin to flow and decrease substantially as a ramp function. During the discharge cycle, a potential is induced across the sense winding 315 which is opposite in polarity to the potential induced in the coil during the transformer charge cycle. The current supplied through the transistor 360 will be relatively small (e.g., on the order of 1 milliampere) and the resistor 326, connected between the base of transistor 320 and the winding 315, may be on the order of 1000 ohms causing a drop across the resistor on the order of 1 volt. The potential developed by the sense winding 315 during the discharge cycle will ordinarily be several volts, causing a negative potential to be applied to the base conductor 321. A potential will also be induced in the sense winding 314 during the discharge cycle, causing the RC circuit 332 to be charged through diode 334. The amount of charge on the RC circuit 332 is a function of the potential induced in winding 314, which is a function of the output voltage produced across the secondary coil 313, which, in turn, depends on the output impedance across the line. In case of a high impedance, the discharge cycle will be relatively short but the output voltage will be large. As the output impedance decreases, the period required for discharge will increase, but output voltage will decrease. The charge across the RC circuit 332, which is connected to one input terminal of the comparator 338, will be increased or decreased accordingly, depending upon the impedance of the load. At the end of the discharge period, the negative polarity voltage induced across the sense winding 315 will disappear and the base current will again flow to the transistor 320 causing the transistor to be turned on. After the transistor has been turned on, the voltage across the emitter resistor 325 will increase, which increase will be sensed at the comparator 338 by means of the connection from the emitter conductor 323 by way of diode 331 to the comparator 338. The emitter resistor may be small. In one experimental circuit arrangement, a 10-ohm resistor was found to be suitable. When the voltage across the resistor reaches a value greater than the charge across the RC circuit 332, the comparator will clamp the base conductor 321 to ground, causing the transistor 320 to be turned off again and the discharge cycle to be initiated once again. The RC circuit 333 is connected to the comparator input terminal which senses the voltage across the resistor 325. The purpose of this RC circuit is to function as a race elimination circuit. Without this circuit, a race condition may occur in which the transistor 320 will be turned off and on in rapid succession.

Figure 5:
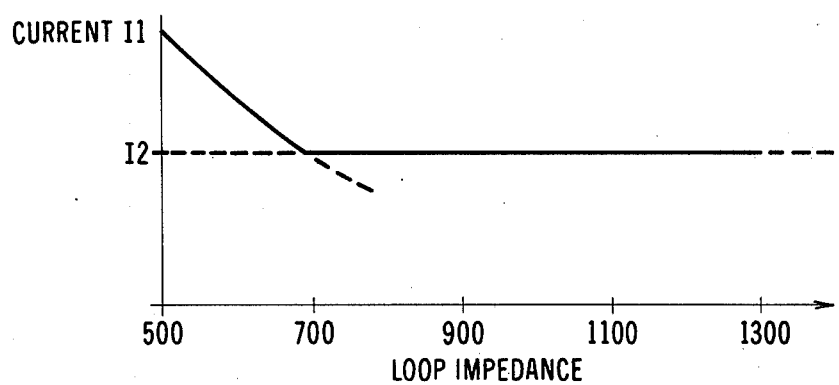
FIG. 5 is graph of the output current as a function of loop impedance.

As mentioned earlier herein, it may be desirable to generate a high current output for short, low resistance loops where standard telephone sets equipped with current shunted varistors are connected to the line. When a subscriber set is at the end of a long loop, the voltage applied across the subscriber set will be relatively low while in a short loop, the voltage will be high since there is no significant voltage drop in the line. In order to accommodate conventional sets equipped with varistors, the power supply circuit 210 is allowed to produce a high current in low resistance lines. This is accomplished by means of a bias voltage applied to the RC circuit 332 through resistor 339. The bias potential requires the voltage across the resistor 325 to rise to the bias value even when the transformer output as sensed in winding 314 is relatively low. Consequently, the transistor 320 will remain in the conducting state for a longer period of time than would normally occur without the bias and a higher output current is produced. Since the bias is fixed, the effect of the bias will be most pronounced for very low impedance loops. As the impedance of the loop increases, the output voltage of the circuit rises and the voltage across the RC circuit 332 eventually will exceed the bias potential and a constant current will be supplied thereafter. FIG. 5 shows the output current characteristic curve as a function of load resistance where the bias is applied by means of resistor 339. The current I1 indicated on the drawing represents the current in a loop having essentially only the impedance of a standard subscriber set. A typical value for I1 may be 30 milliamperes. Without the use of the comparator circuit 338, the current would continue to decrease as the loop impedance increases. Depending on the selected value of the resistor 339 and the resistance of the RC circuit 332, the effect of the comparator 338 may be inhibited for certain lower values of load impedance, for example, below 700 ohms. For larger values of impedance (e.g., 700 to 3000 ohms) the action of the comparator will take over, producing a substantially constant output current I2 of, for example, 25 milliamperes. It will be understood that actual values of the output current will depend, to a large extent, on the characteristics of a commercially available output transformer.

As described earlier herein, supervision to determine the on-hook and off-hook state of the line may be accomplished in the SCAN state of the circuit. Dial pulse signaling from a rotary dial at the subscriber set may also be detected at the power supply circuit 210 of the line interface circuit by periodic interrogation of the circuit by the controller 140. When a rotary dial of a subscriber set is operated, the line will be successively opened and closed at the subscriber set. Such open circuit and closed circuit conditions may be detected at the line interface circuit while the circuit is in the TALK state. In the TALK state, full power will normally be supplied to the subscriber line, in contrast to the condition in the SCAN state in which power is applied only for a short period of time under control of a clock pulse. When the line circuit is opened while the interface circuit is in the TALK state, a high voltage will tend to develop across the secondary transformer coil 313 which will be reflected in the other coils of the transformer, including the sense winding 316. As a consequence, a high voltage will develop across the serially connected diodes 377 and 379. The latter is a light emitting diode which is clamped to the potential of the power supply V1 and is optically coupled to the transistor 371. When the voltage reflected across the sense winding 316 exceeds the supply voltage by an amount equivalent to the sum of the forward voltage drops of the diodes 377 and 379, current will begin to flow in the diodes and transistor 371 will be placed in the conducting state by means of the optical coupling between the transistor and the light emitting diode 379. When the transistor 371 is placed in the conducting state, the voltage level of the conductor 373 will drop to a near zero level. By periodic interrogation of the conductor 373 by the controller 140, the dial pulse signaling information may be transferred to the controller 140. The conventional diode 377 is not essential in the circuit. It is employed only to provide better isolation than is generally obtained from light emitting diodes.

Clamping of the output of sense winding 316 to the power supply potential V1 also provides protection against excessive voltages which would otherwise tend to develop in the output transformer with an open circuit load and which could damage the circuit. It will be recognized that the maximum attainable output voltage is directly dependent on the value of the power supply potential V1 and the coupling between the sense winding 316 and the secondary coil 313.

It is to be understood that the above-described arrangement is merely an illustrative application of the principles of the invention and that numerous other arrangements may be devised by those skilled in the art without departing from the spirit and scope of the invention.

What is claimed is:

1. A current supply circuit comprising:
    a transformer having a primary winding connectable to an electrical power source and a secondary winding connectable to an electrical load;
    a switching device connected to said primary winding for controlling current flow in said primary winding;
    a first sense winding magnetically coupled to said primary and secondary windings and connected to said switching device for controlling said switching device to allow current flow in said primary winding;
    a second sense winding magnetically coupled to at least said secondary winding for generating output signals representative of current flow in said secondary winding;
    sensing means for sensing current flow in said primary winding and for generating output signals representing current flow in said primary winding; and
    a comparator circuit having a first input terminal connected to said second sense winding, a second input terminal connected to said sensing means, and an output terminal connected to said switching device and responsive to said signals from said second sense winding and said sensing means for turning off said switching device.

2. A constant current source for use in combination with a telephone subscriber set comprising:
    a transformer having a primary winding connectable to an electrical power source and a secondary winding connectable to said subscriber set;
    a transistor connected in series with said primary winding for controlling current flow in said primary winding;
    a first sense winding magnetically coupled to said primary winding and said secondary winding and connected to a control terminal of said transistor;
    a second sense winding magnetically coupled to said secondary winding for sensing current in said secondary winding;
    a resistor connected in series with said primary winding; and
    a comparator circuit having a first input terminal connected to said second sense winding, a second input terminal connected to said resistor, and an output terminal connected to said control terminal of said transistor.

3. A constant current source for use in combination with a communication line comprising:
    a transformer having a secondary winding connectable to said communication line and a primary winding connectable to an electrical power source;
    a diode in series with said secondary winding;
    a resistor in series with said primary winding;
    a transistor connected in series with said primary winding and said resistor and having a base terminal;
    a first sense winding magnetically coupled to said primary and said secondary windings and connected to said base terminal for supplying base current thereto;
    charge storage means;
    a second sense winding magnetically coupled to said secondary winding and connected to said charge storage means for charging said charge storage means when current is flowing in said secondary winding; and a comparator circuit having a first input terminal connected to said charge storage means, a second input terminal connected to said resistor, and an output terminal connected to said base terminal and responsive to an electrical potential applied to said second input terminal which is greater than the electrical potential applied to said first input terminal to inhibit operation of said transistor at said base terminal.

4. A constant current source for use with a communication line comprising:

a transformer having a primary winding connectable to an electrical power source and a secondary winding connectable to said communication line;

a rectifier circuit connected to said secondary winding;

a transistor connected in series with said primary winding and having a control terminal;

a first sense winding magnetically coupled to said primary and secondary windings and connected to said control terminal for applying a potential of a first polarity to said control terminal when current is flowing in said primary winding and for applying a potential of a second polarity opposite to said first polarity to said control terminal when current is flowing in said secondary winding;

a charge storage device;

a second sense winding magnetically coupled to said secondary winding and connected to said charge storage device for charging said device to a potential corresponding to an output potential developed across said secondary winding;

a resistor connected in series with said primary winding and said transistor; and comparator means having input terminals connected to said charge storage device and said resistor and an output terminal connected to said control terminal for comparing potential on said charge storage device with the potential drop across said resistor and for inhibiting operation of said transistor at said control terminal when said potential drop across said resistor exceeds said potential on said charge storage device.

5. A constant current source in accordance with claim 4 and further comprising means for applying a predetermined bias potential to said charge storage device, whereby said comparator will inhibit operation of said transistor only when said potential drop across said resistor exceeds said bias potential and said potential corresponding to said output potential.

6. A constant current source in accordance with claim 4 wherein said charge storage device comprises an RC circuit.

7. A communication switching system having a plurality of communication lines, a switching network, a plurality of line interface circuits for interconnecting said communication lines and said network, and means for supplying electrical power to the interface circuits, each of said interface circuits comprising a current supply circuit transformer coupled to an associated communication line by means of a transformer having a primary winding and a secondary winding, each current supply circuit further comprising a switching device connected to said primary winding for controlling current flow therein and a first sense winding and a second sense winding magnetically coupled to said transformer windings for controlling said switching means.

8. A communication switching system in accordance with claim 7 wherein said first sense winding controls said switching device to allow current flow in said primary winding, wherein said second sense winding provides a first output signal representative of transformer output voltage developed across said secondary winding, and wherein said current supply circuit further comprises means for generating a second output signal representative of current flow in said primary winding and means responsive to said first and said second output signals for controlling said switching device to inhibit current flow in said primary winding.

* * * * *